UNITED STATES PATENT OFFICE.

HANS ZWICK, OF NEUSTADT, GERMANY.

PROCESS OF CLARIFYING BEVERAGES.

1,045,245.     Specification of Letters Patent.     Patented Nov. 26, 1912.

No Drawing.     Application filed March 28, 1911. Serial No. 617,378.

*To all whom it may concern:*

Be it known that I, HANS ZWICK, chemist, a subject of the German Emperor, residing at Neustadt a. H., in the Kingdom of Bavaria and Empire of Germany, have invented certain new and useful Improvements in Processes of Clarifying Beverages Capable of being Preserved from Fruit-Juices, of which the following is a specification.

Both fresh as also partially or wholly fermented fruit juices contain as a rule organic substances of various kinds in solution, which partly serve as nourishment for the yeast, but otherwise present difficulties in pasteurizing, with which procedure numerous advantages are connected, as they impart to the juices on heating an unpleasant taste which cannot be removed. Further after fermentation and often after years organic matters are separated out which make the wine, which has been clarified by the known methods, again turbid. Even if they remain dissolved, they can act disadvantageously, as they assist in the re-development of the yeast still present and are favorable to re-fermentation.

From the above arises the problem of converting the above described dissolved substances within a short time either into insoluble substances, which for example can easily be separated by filtration, or into other soluble substances which no longer cause the hereindescribed inconveniences. Now I have found that this problem is solved if the beverages for example are heated for 15 minutes to a temperature of at least 30° C. and preferably to about 45° C., while simultaneously distributing in them $\frac{1}{2}$% of finely pulverized kaolin, Spanish clay, fullers' earth, bole or similarly acting mineral substances. By the term "Spanish clay" I refer to a clay found in the neighborhood of Cadiz, Spain, and sold in Spain under the name of "Tierra Del Vino." The beverages after treatment with such earths can be heated to temperatures of 100° C., immediately or after previous clarification, if it is necessary to prevent a subsequent fermentation, without causing a disadvantageous alteration in taste or a subsequent turbidity.

The necessary temperature, duration and quantity of earths are variable according to the composition or the origin of the must and wines.

I claim:

1. The hereindescribed process of clarifying beverages, capable of being preserved, made from fruit juices, which consists in heating the juices for about 15 minutes to a temperature of about 45° C., simultaneously distributing in the juices about one-half per cent. of a finely pulverized clay and then pasteurizing the beverages thus treated, substantially as described.

2. The hereindescribed process of clarifying beverages, capable of being preserved, made from fruit juices, which consists in heating the juices for about 15 minutes to a temperature of about 45° C., simultaneously distributing in the juices about one-half per cent. of a finely pulverized clay, then clarifying the beverages thus treated, and finally pasteurizing the same, substantially as described.

In testimony whereof I have hereunto signed my name in the presence of two subscribing witnesses.

HANS ZWICK.

Witnesses:
 AUGUST O. LINNEUS,
 LUITPOLD DUELL.